United States Patent
Molter et al.

(10) Patent No.: US 6,613,215 B2
(45) Date of Patent: Sep. 2, 2003

(54) METHOD FOR ELECTROLYSIS OF WATER USING A POLYTETRAFLUOROETHYLENE SUPPORTED MEMBRANE IN ELECTROLYSIS CELLS

(75) Inventors: Trent M. Molter, Glastonbury, CT (US); Jason K. Shiepe, Middletown, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 68 days.

(21) Appl. No.: 09/960,220

(22) Filed: Sep. 21, 2001

(65) Prior Publication Data

US 2002/0079235 A1 Jun. 27, 2002

Related U.S. Application Data

(60) Provisional application No. 60/235,831, filed on Sep. 27, 2000.

(51) Int. Cl.$^7$ ................................................. C02F 1/461
(52) U.S. Cl. ....................... 205/628; 205/629; 205/746; 205/770; 204/263; 204/266
(58) Field of Search ................. 205/746, 770, 205/628, 629; 204/263, 266

(56) References Cited

U.S. PATENT DOCUMENTS

| | | | |
|---|---|---|---|
| 3,593,566 A | 7/1971 | Loopuyt | 73/37.7 |
| 3,935,029 A | 1/1976 | Baker et al. | 136/121 |
| 4,729,932 A * | 3/1988 | McElroy | 429/34 |
| 4,865,925 A | 9/1989 | Ludwig et al. | 429/12 |
| 5,512,145 A * | 4/1996 | Hollenberg | 205/628 |
| 5,547,551 A | 8/1996 | Bahar et al. | 204/296 |
| 5,599,614 A | 2/1997 | Bahar et al. | 442/171 |
| 5,635,041 A | 6/1997 | Bahar et al. | 204/282 |
| 5,874,182 A | 2/1999 | Wilkinson et al. | 429/30 |

FOREIGN PATENT DOCUMENTS

WO  WO 01/45192  6/2001

OTHER PUBLICATIONS

R. Baldwin et al: "Hydrogen–oxygen proton–exchange membrane fuel cells and electrolyzers" Journal of Power Sources, vol. 29, No. 3/4, Feb. 1990 (1990–02), pp. 399–412 XP000233855.
International Search Report, International Application No. PCT/US 01/29827, International Filing Date Sep. 24, 2001, Date of Mailing Jun. 28, 2002, 7 pages.
"Gore–Select Membranes", Ion Transport Products, 2 pages, 1998.
"Primea Membrane Electrode Assemblies", Ion Transport Products, 2 pages, 1998.
"Carbel Gas Diffusion Media", Ion Transport Products, 2 pages, 1998.
"Advanced Composite Polymer Electrolyte Fuel Cell Membranes", Jeffery A. Kolde, et al., 4 pages (no date).
"Recent Advances in Composite Ion Exchange Membranes of Industrial Applications", Greg Rusch, et al., Presented at the "Power of Electrochemistry—10th International Forum", Nov. 10, 1996, 5 pages.

\* cited by examiner

*Primary Examiner*—Arun S. Phasge
(74) *Attorney, Agent, or Firm*—Cantor Colburn LLP

(57) ABSTRACT

A method for operating an electrolysis cell at a range of pressures and current densities, the cell having an ultrathin composite membrane, preferably comprising an expanded polytetrafluoroethylene base material impregnated with a hydrogen conducting ionomer. The resulting membrane is unexpectedly durable and efficient when used in an electrolysis cell operating at high membrane pressure differentials, thereby allowing greater cell current densities and efficiency.

23 Claims, 1 Drawing Sheet

METHOD FOR ELECTROLYSIS OF WATER USING A POLYTETRAFLUOROETHYLENE SUPPORTED MEMBRANE IN ELECTROLYSIS CELLS

CROSS REFERENCE TO RELATED APPLICATIONS

This application claims the benefits of U.S. Provisional Patent Application Serial No. 60/235,831 filed Sep. 27, 2000, which is fully incorporated herein by reference.

BACKGROUND

This disclosure relates generally to proton exchange membrane electrolysis cells, and, more particularly, to a membrane for use in such electrolysis cells.

Electrochemical cells are energy conversion devices that are usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the related art is shown at 10 and is hereinafter referred to as "cell 10." Reactant water 12 is fed into cell 10 at an oxygen electrode (e.g., an anode) 14 where a chemical reaction occurs to form oxygen gas 16, electrons, and hydrogen ions (protons). The chemical reaction is facilitated by the positive terminal of a power source 18 connected to anode 14 and a negative terminal of power source 18 connected to a hydrogen electrode (e.g., a cathode) 20. Oxygen gas 16 and a first portion 22 of the water are discharged from cell 10, while the protons and a second portion 24 of the water migrate across a proton exchange membrane 26 to cathode 20. At cathode 20, hydrogen gas 28 is formed and is removed for use as a fuel. Second portion 24 of water, which is entrained with hydrogen gas, is also removed from cathode 20.

Another type of water electrolysis cell that utilizes the same configuration as is shown in FIG. 1 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the cell at the cathode side without passing through the membrane.

Electrolysis cell systems typically include one or more individual cells arranged in a stack, with the working fluids directed through the cells via input and output conduits formed within the stack structure. The cells within the stack are sequentially arranged, each including a cathode, a proton exchange membrane, and an anode (hereinafter "membrane electrode assembly", or "MEA"). Each cell typically further comprises a first flow field in fluid communication with the cathode and a second flow field in fluid communication with the anode. The MEA may be supported on either or both sides by support members such as screen packs disposed within the flow fields, and which may be configured to facilitate membrane hydration and/or fluid movement to and from the MEA. Pressure pads or other compression means are often used to provide even compressive force from within the electrochemical cell.

Conventional electrolysis cells have been functionally limited by the lack of mechanical strength of conventional membranes, which rupture if subjected to excessive pressure, regardless of the efficacy of the flow fields. U.S. Pat. No. 5,547,551 to Bahar et al., which is incorporated herein in its entirety, discloses an ultrathin composite membrane comprising a base material and an ion exchange resin. Such membranes are conventionally used in fuel cells at very low membrane pressure differentials. There accordingly remains a need in the art for methods for operating an electrolysis cell at high pressure differentials (up to and exceeding about 10,000 pounds per square inch (psi) across the membrane without the conventional membrane damage associated with such high pressures.

SUMMARY OF INVENTION

The above-described drawbacks and disadvantages are alleviated by a method for the electrolysis of water, comprising applying a potential across an ultrathin composite membrane disposed between the first electrode and second electrode; introducing water to the ultrathin composite membrane through a first flow field in fluid communication with at least a portion of the first electrode; dissociating the water at the first electrode to form oxygen, protons, and electrons; moving the protons across the ultrathin composite membrane to the second electrode; and recombining the protons and the electrons at the second electrode to form hydrogen in a hydrogen flow field, at pressure differentials across the ultrathin composite membrane up to about 10,000 psi, or even higher.

In another embodiment, an electrolysis cell for the electrolysis of water comprises a first electrode; a second electrode; an ultrathin composite membrane disposed between and in intimate contact with the first electrode and the second electrode; a first flow field in fluid communication with the first electrode opposite the membrane; a second flow field in fluid communication with to the second electrode opposite the membrane; a water source in fluid communication with the first flow field; and hydrogen removal means in fluid communication with the second flow field.

The above described and other features are exemplified by the following figures and detailed description.

BRIEF DESCRIPTION OF THE DRAWINGS

Referring now to the drawings, which are meant to be exemplary and not limiting, and wherein like elements are numbered alike in the several FIGURES.

DETAILED DESCRIPTION

A method is provided for the electrolysis of water via a supported, ultrathin composite membrane at pressure differentials up to about 10,000 psi, preferably from about 50 to about 8,000 psi, more preferably from about 100 to about 6,000 psi, still more preferably about 200 to about 4,000 psi, and most preferably about 500 to about 2,000 psi. Pressures higher than about 10,000 psi are even possible. These supported ion exchange materials can be utilized on anode feed electrolysis cells or cathode feed electrolysis cells. Use of the ultrathin composite membrane thus allows for high membrane pressure differentials, higher current densities, and greater cell efficiency.

Although the disclosure below is described in relation to a proton exchange membrane electrolysis cell employing hydrogen, oxygen, and water, other types of electrolysis cells and/or electrolytes may be used, including, but not limited to, phosphoric acid, and the like. Various reactants can also be used, including, but not limited to, hydrogen bromide, oxygen, air, chlorine, and iodine. Upon the application of different reactants and/or different electrolytes, the flows and reactions change accordingly, as is commonly understood in relation to that particular type of electrolysis cell. Furthermore, while the discussion below is directed to an anode feed electrolysis cell, it should be understood by those of skill in the art that cathode feed electrolysis cells, fuel cells, and regenerative fuel cells are also within the scope of the embodiments disclosed.

Figure 1:
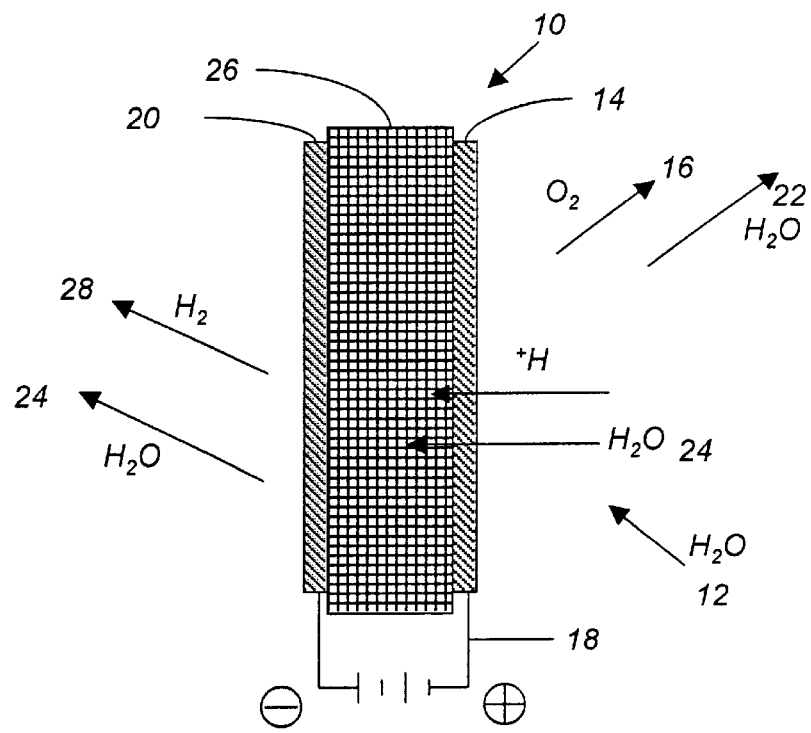
FIG. 1 is a schematic representation of an anode feed electrolysis cell of the related art.
Figure 2:
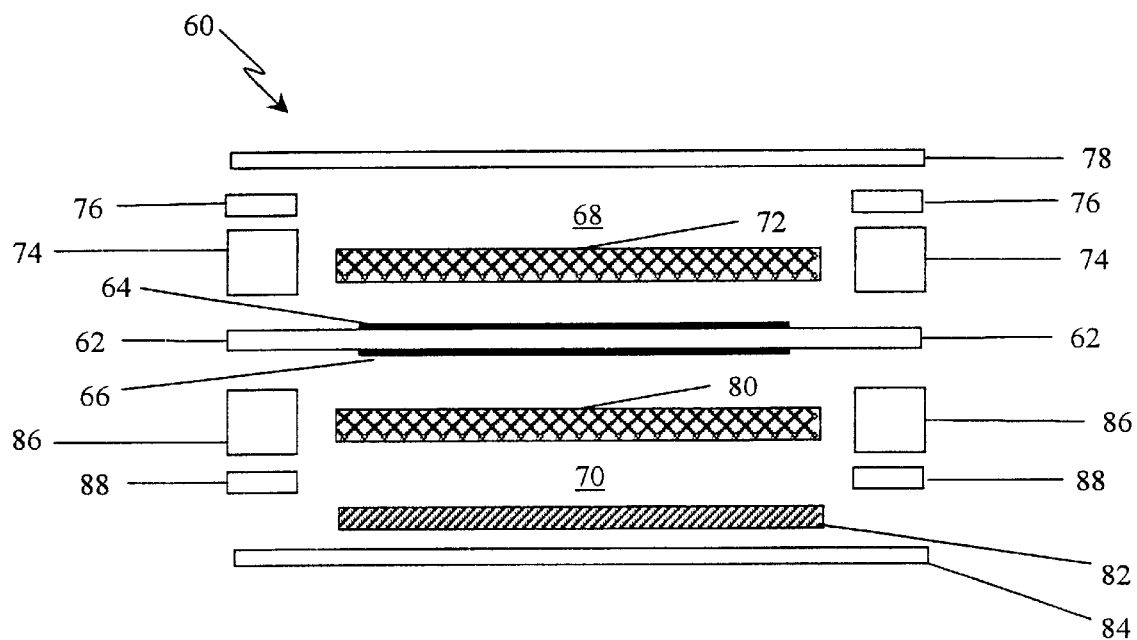
FIG. 2 is a cross sectional schematic representation of an electrolysis cell system.

Referring to FIG. 2, cell 60 is typically one of a plurality of cells employed in a cell stack as part of an electrolysis cell system. When cell 60 is utilized as an electrolysis cell, power inputs are generally between about 1.48 volts and about 3.0 volts, with current densities including but not limited to between about 50 A/ft$^2$ (amperes per square foot) and about 4,000 A/ft$^2$. When utilized as a fuel cell, power outputs range between about 0.4 volts and about 1 volt, with current densities being between about 0.1 A/ft$^2$ and about 10,000 A/ft$^2$. The number of cells within the stack and the dimensions of the individual cells is scalable to the cell power output and/or gas output requirements.

Cell 60 comprises an MEA defined by an ultrathin membrane 62 having a first electrode (e.g., an anode) 64 and a second electrode (e.g., a cathode) 66 disposed on opposing sides thereof. Regions proximate to and bounded on at least one side by anode 64 and cathode 66 respectively define flow fields 68, 70. A flow field support member 72 may be disposed adjacent to anode 64 and retained within flow field 68 by a frame 74 and a cell separator plate 78. A gasket 76 is optionally positioned between frame 74 and cell separator plate 78 to effectively seal flow field 68.

A flow field support member 80 maybe disposed adjacent to cathode 66. A pressure pad 82 is typically disposed between flow field support member 80 and a cell separator plate 84 disposed adjacent to pressure pad 82. Flow field support member 80 and pressure pad 82 are retained within flow field 70 by a frame 86 and a cell separator plate 84. Because pressure pad 82 is fabricated from materials that are compatible with the cell environment, cell 60 is generally operated without a pressure pad separator plate. A gasket 88 is optionally positioned between frame 86 and cell separator plate 84 to effectively seal flow field 70. The cell components, particularly frames 74, 86, cell separator plates 78, 84, and gaskets 76, 88, are formed with the suitable manifolds or other conduits to facilitate fluid communication through cell 60.

Anode 64 and cathode 66 are disposed on opposing sides of an ultrathin membrane 62 ("membrane 62"), which will be discussed, along with the description of the membrane 62, in detail below. The anode 64 and cathode 66 are fabricated from catalyst materials suitable for performing the needed electrolysis reaction (i.e., electrolyzing water to produce hydrogen and oxygen). Suitable materials for anode 64 and cathode 66 include, but are not limited to, platinum, palladium, rhodium, carbon, gold, tantalum, tungsten, ruthenium, iridium, osmium, alloys thereof, and the like. Anode 64 and cathode 66 may be adhesively disposed on membrane 62, or may be positioned adjacent to, but in contact with, membrane 62. In another embodiment, the anode and cathode material can be provided in a form that is miscible with the proton exchange material of the membrane 62. The mixture of catalyst and proton exchange materials can then be applied to the base material of membrane 62. Typically, such a mixture is applied to one or both sides of the base material, after treatment with a proton exchange material, which will be discussed in detail below.

Flow field support members 72, 80 allow the passage of system fluids and are preferably electrically conductive. Such support members 72, 80 may comprise, for example, screen packs or bipolar plates. Screen packs include one or more layers of perforated sheets or a woven mesh formed from metal strands. Typical metals that may be used to fabricate screen packs include, for example, niobium, zirconium, tantalum, titanium, carbon steel, stainless steel, nickel, cobalt, and alloys thereof. Bipolar plates are commonly porous structures comprising fibrous carbon or fibrous carbon impregnated with polytetrafluoroethylene or PTFE (commercially available under the trade name TEFLON® from E.I. du Pont de Nemours and Company).

Compression is maintained in cell 60 via pressure pad 82. Pressure pad 82 is disposed in direct contact with flow field 70 and is positioned adjacent to the cell separator plate on either the anode or the cathode side of membrane 62. Furthermore, it should be understood that pressure pads 82 may be disposed on both sides of membrane 62, and that pressure pad 82 may be positioned within either or both of the flow fields of cell 60 in place of either or both of the flow field support members.

An exemplary embodiment of pressure pad 82 comprises an electrically conductive material configured to provide for the even distribution of compression within the cell. Suitable electrically conductive materials include, but are not limited to, conductive metals and alloys and superalloys thereof, for example niobium; zirconium; tantalum; titanium; niobium; iron and iron alloys, for examples steels such as stainless steel; nickel and nickel alloys such as HASTELLOY7 (commercially available from Haynes International, Kokomo, Ind.); cobalt and cobalt superalloys such as ELGILOY7 (commercially available from Elgiloy® Limited Partnership, Elgin, Ill.) and MP35N7 (commercially available from Maryland Specialty Wire, Inc., Rye, N.Y.); hafnium, and tungsten, among others, with titanium preferred because of its strength, durability, availability, low cost, ductility, low density, and its compatibility with the electrolysis cell environment. Electrically conductive carbon may also be used. In one embodiment, the electrically conductive material comprises a plurality of VITON® cords woven or stitched into a conductive carbon cloth substrate.

To assist in providing for the even distribution of compression, pressure pad 82 may further comprise an elastomeric material. Suitable elastomeric materials include, but are not limited to silicones, such as fluorosilicones; fluoroelastomers, such as KALREZ® (commercially available from E.I. du Pont de Nemours and Company), VITON® (commercially available from E.I. du Pont de Nemours and Company), and FLUOREL® (commercially available from Minnesota Mining and Manufacturing Company, St. Paul, Minn.); and combinations thereof.

Both the electrically conductive material and the elastomeric material are preferably compatible with the system fluids and the material from which membrane 62 is fabricated. Pressure pad 82 is optionally porous to allow passage of water or system gases and is capable of allowing intimate contact to be maintained between cell components at high pressures. Pressure pad 82 is configured to withstand high pressures while maintaining its operability over extended time periods. In particular, pressure pad 82 is configured to withstand pressure differentials up to or exceeding about 100 psi, and more preferably up to about 10,000 psi.

To electrolyze water at pressure differentials up to about 10,000 psi the electrolysis cell utilizes the ultrathin membrane 62. The ultrathin membrane 62 is a composite membrane that comprises a base material and an ion exchange material or ion exchange resin. The base material is a membrane which is defined by a thickness of less than about 1 mil (0.025 mm) and a porous microstructure characterized by nodes interconnected by fibrils or a porous microstructure characterized substantially by fibrils. The ion exchange resin substantially impregnates the membrane so as to render the interior volume occlusive. For instance, by filling greater than 90% of the interior void volume of the membrane with ion exchange resin sufficient occlusion will occur. The ion exchange resin is securely adhered to both the external and internal membrane surfaces, i.e., the fibrils and/or nodes of the base material.

The ultrathin composite membrane is uniform, occlusive, and mechanically strong. As used herein, "ultrathin" is defined as less than about 1 mil (0.025 millimeters, "mm"). The lower limit will depend upon a number of factors, for example the pressure differential across the membrane, the particular materials used, and the type and effectiveness of other support, for example screen packs and/or pressure pads. Typical lower limits will be about 1 micrometer. Further as used herein "uniform" is defined as continuously impregnated with the ion exchange material such that no, or few pinholes or other discontinuities exist within the composite structure. The membrane is preferably "occlusive," meaning that the porous membrane is impregnated such that the interior void volume is greater than 90, preferably greater than 95, and most preferably greater than 98 volume percent filled with the ion exchange material, such that the final membrane is essentially impermeable to the bulk flow of liquids and air, i.e., having a Gurley number of greater than 10,000 seconds.

A preferred base material is an expanded polytetrafluoroethylene (ePTFE) made in accordance with the teachings of U.S. Pat. No. 3,593,566, which is incorporated herein by reference. Such a base material has a porosity of greater than about 35 volume percent. Preferably, the porosity is from about 70 to about 95 volume percent of the total base material volume. The thickness of the base material is less than about 1 mil (0.025 mm). Preferably, the thickness is between about 0.6 mils (0.015 mm) and about 0.8 mils (0.02 mm), and most preferably, between about 0.50 mils (0.013 mm) and about 0.75 mils (0.019 mm). This material is commercially available in a variety of forms from W. L. Gore & Associates, Inc., of Elkton, Md., under the trademark GORE-TEX®. The porous microstructure of this base material comprises nodes interconnected by fibrils, which define an interior volume of the base material. Alternatively, the base material may comprise an ePTFE material having a porous microstructure defined substantially by fibrils, with no nodes present. Such a base material may be referred to as a nonwoven web.

To manufacture an ePTFE nonwoven web, a PTFE that has a low amorphous content and a degree of crystallization of at least 98% is used as the raw material. More particularly, a coagulated dispersion or fine powder PTFE may be employed, such as but not limited to Fluon®, CD-123, and Fluon®, CD-1, available from ICI Americas, Inc., or TEFLON® fine powders commercially available from E.I. DuPont de Nemours and Co., Inc. These coagulated dispersion powders are lubricated with a hydrocarbon extrusion aid, preferably an odorless mineral spirit, such as ISOPAR K® (made by Exxon Corp.). The lubricated powder is compressed into cylinders and extruded in a ram extruder to form a tape. The tape is compressed between rolls to an appropriate thickness, usually about 5 to about 10 mils. The wet tape is stretched traversely to about 1.5 to about 5 times its original width. The extrusion aid is driven off with heat. The dried tape is then expanded longitudinally between banks of rolls in a space heated to a temperature that is below the polymer melting point (approximately 327° C.). The longitudinal expansion is such that the ratio of speed of the second bank of rolls to the first bank is from about 10–100 to 1 ratio. The longitudinal expansion is repeated at about 1–1.5 to 1 ratio.

After the longitudinal expansion, the tape is expanded traversely, at a temperature that is less than about 327° C., to at least 1.5 times, and preferably to 6 to 15 times, the width of the original extrudate, while restraining the membrane from longitudinal contraction. While still under constraint, the membrane is preferably heated to above the polymer melting point (approximately 342° C.) and then cooled. This nonwoven web is characterized by the following: (a) average pore size between about 0.05 and about 0.4 micrometers, and preferably less than about 0.2 micrometers; (b) a bubble point between about 10 and about 60 pounds per square inch (psi); (c) a pore size distribution value between about 1.05 and about 1.20; (d) a ball burst strength between about 0.9 and about 17 pounds/force; (e) an air flow of between about 20 Frazier and about 10 Gurley seconds; (f) a thickness between about 1.32 micrometers and about 25.4 micrometers; and (g) a fiber diameter of between about 5 and about 20 nanometers.

Ion-exchange materials useful as proton conducting materials include, but are not limited to, hydrocarbon-containing ion exchange materials, and fluorocarbon-containing ion exchange materials. Hydrocarbon-containing ion-exchange materials can include phenolic or sulfonic acid-containing resins; condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-containing ion-exchange resins can include hydrates of a tetrafluoroethylene-perfluorosulfonyl ethoxyvinyl ether or tetrafluoroethylene-hydroxylated (perfluoro vinyl ether) copolymers. When oxidation and/or acid resistance is desirable, fluorocarbon-containing resins having sulfonic, carboxylic and/or phosphoric acid functionality are preferred. Fluorocarbon-containing materials typically exhibit excellent resistance to oxidation by halogen, strong acids, and bases. One family of fluorocarbon-containing resins having sulfonic acid group functionality is the NAFION™ materials (DuPont Chemicals, Wilmington, Del.). A mixture of these ion exchange resins may also be employed in treating the membrane. Solvents that are suitable for use with the ion exchange material, include for example, alcohols, carbonates, THF (tetrahydrofuran), water, and combinations comprising at least one of the foregoing solvents.

A surfactant having a molecular weight of greater than 100 is preferably employed with the ion exchange resin to ensure impregnation of the interior volume of the base material. Surfactants or surface-active agents having a hydrophobic portion and a hydrophilic portion may be utilized. Preferable surfactants are those having a molecular weight of greater than 100 and may be classified as anionic, nonionic, or amphoteric which may be hydrocarbon or fluorocarbon-containing and include for example, MERPOL®, a hydrocarbon-containing surfactant or ZONYL®, a fluorocarbon-containing surfactant, both commercially available from E.I. DuPont de Nemours, Inc. of Wilmington, Del.

A preferred surfactant is a nonionic material, octylphenoxy polyethoxyethanol having a chemical structure,

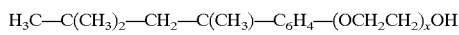

wherein x has an average value of 10. This material, known as Triton X-100, is commercially available from Rohm & Haas of Philadelphia, Pa.

Optionally, the composite membrane may be reinforced with a woven or nonwoven material bonded to one side of the base material. Suitable woven materials may include, for example, scrims made of woven fibers of expanded porous polytetrafluoroethylene; webs made of extruded or oriented polypropylene or polypropylene netting, commercially available from Conwed, Inc. of Minneapolis, Minn.; and woven materials of polypropylene and polyester, commercially available from Tetko Inc., of Briarcliff Manor, N.Y. Suitable non-woven materials may include, for example, a spun-bonded polypropylene commercially available from Reemay Inc. of Old Hickory, Tenn.

The treated membrane may be further processed to remove any surfactant, which may have been employed in processing the base material. This is accomplished by soaking or submerging the membrane in a solution of, for example, water, isopropyl alcohol, hydrogen peroxide, methanol, and/or glycerin. During this step, the surfactant, which was originally mixed in solution with the ion exchange material, is removed. This soaking or submerging causes a slight swelling of the membrane; however, the ion exchange material remains within the interior volume of the base material.

The membrane is further treated by boiling in a suitable swelling agent, preferably water, causing the membrane to slightly swell in the x and y direction. Additional swelling occurs in the z-direction.

The resulting composite membrane has a higher ion transport rate, and is also strong. The swollen membrane retains its mechanical integrity and dimensional stability, unlike the membranes consisting only of the ion exchange material, and simultaneously maintains desired ionic transport characteristics. A correlation exists between the content of the swelling agent within the membrane structure and transport properties of the membrane. A swollen membrane will transport chemical species faster than an unswollen membrane.

Although the membrane has excellent long term chemical stability, it can be susceptible to poisoning by organics. Accordingly, it is often desirable to remove such organics from the membrane. For example, organics can be removed by regeneration in which the membrane is boiled in a strong acid such as nitric or chromic acid.

To prepare the ultrathin integral composite membrane, a support structure, such as a polypropylene woven fabric, may first be laminated to the untreated base material by any conventional technique, such as hot roll lamination, ultrasonic lamination, adhesive lamination, or forced hot air lamination, so long as the technique does not damage the integrity of the base material. A solution is prepared containing an ion exchange material in solvent mixed with one or more surfactants. The solution may be applied to the base material by any conventional coating technique including forward roll coating, reverse roll coating, gravure coating, doctor coating, as well as dipping, brushing, painting, and spraying, so long as the liquid solution is able to penetrate the interstices and interior volume of the base material. Excess solution from the surface of the membrane may be removed. The treated membrane is then immediately placed into an oven to dry. Oven temperatures may range from about 60° to about 200° C., but preferably about 120° to about 160° C. Drying the treated membrane in the oven causes the ion exchange resin to become securely adhered to both the external and internal membrane surfaces, i.e., the fibrils, and/or nodes of the base material. Additional solution application steps, and subsequent drying, may be repeated until the membrane becomes completely transparent. Typically, between 2 to 8 treatments are required, but the actual number of treatments is dependent on the surfactant concentration and thickness of the membrane. If the membrane is prepared without a support structure, both sides of the membrane may be treated simultaneously thereby reducing the number of treatments required.

The oven treated membrane is then soaked in a solvent, such as the type described hereinabove, to remove the surfactant. Thereafter, the membrane is boiled in a swelling agent and under a pressure ranging from about 1 to about 20 atmospheres absolute, thereby increasing the amount of swelling agent the treated membrane is capable of holding.

Alternatively, the ion exchange material may be applied to the membrane without the use of a surfactant. This procedure requires additional treatment with the ion exchange resin. However, this procedure does not require that the oven treated membrane be soaked in a solvent, thereby reducing the total number of process steps. In addition, a vacuum may also be used to draw the ion exchange material into the membrane. Treatment without surfactant is made easier if the water content of the solution is lowered. Partial solution dewatering is accomplished by slow partial evaporation of the ion exchange material solution at room temperature followed by the addition of a non-aqueous solvent. Ideally, a fully dewatered solution can be used. This is accomplished in several steps. First, the ion exchange material is completely dried at room temperature. The resulting resin is ground to a fine powder. Finally, this powder is redissolved in a solvent, preferably a combination of methanol and isopropanol to form the dewatered solution.

Electrolysis cell systems suitable for use with the ultrathin membrane are known in the art, and as described above, generally comprise a first electrode 64; a second electrode 66; an ultrathin composite membrane 62 disposed between and in intimate contact with first and second electrodes 64, 66; a first flow field 68 in fluid communication with the first electrode 64 opposite the membrane 62; and a second flow field 70 in fluid communication with the second electrode 66 opposite the membrane 62. In addition, the cell system comprises a reactant source, such as a tank, in fluid communication with the first or second flow field 68, 70; and electrolysis product removal means, for example gas and fluid lines, in fluid communication with the other flow field.

The pressure differential between the cathode side of the membrane and the anode side of the membrane can be important in the hydrogen production capacity of the electrolysis cell described above. Electrolysis cells utilizing ultrathin composite membranes such as those described above may be operated at conventional membrane pressure differentials, i.e., those up to about 10 psi. In addition, electrolysis cells as described herein may also operate at pressure differentials up to about 50, preferably up to about 100, more preferably up to about 200, and still more preferably up to about 400 psi. It is anticipated that operation at differential pressures up to about 1,000, preferably up to about 2,000, more preferably up to about 4,000, and still more preferably up to about 6,000, 8,000, or most preferably up to about 10,000 psi is achieved. This high pressure differential across the membrane is achieved by providing a back pressure on the hydrogen side, the oxygen side, or both.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for the electrolysis of water, comprising:

applying a potential across an ultrathin composite membrane disposed between a first electrode and a second electrode;

introducing water to the ultrathin composite membrane through a first flow field in fluid communication with at least a portion of the first electrode;

dissociating the water at the first electrode to form oxygen, protons, and electrons;

moving the protons across the ultrathin composite membrane to the second electrode; and recombining the protons and the electrons at the second electrode to form hydrogen in a second flow field, wherein a pressure differential across the ultrathin composite membrane is up to about 10,000 psi.

2. The method of claim 1, wherein the pressure differential across the ultrathin composite membrane is between about 50 to about 8,000 psi.

3. The method of claim 1, wherein the pressure differential across the ultrathin composite membrane is between about 100 to about 6,000 psi.

4. The method of claim 1, wherein the pressure differential across the ultrathin composite membrane is between about 200 to about 4,000 psi.

5. The method of claim 1, wherein the pressure differential across the ultrathin composite membrane is between about 500 to about 2,000 psi.

6. The method of claim 1, wherein the ultrathin composite membrane comprises:

an expanded polytetrafluoroethylene base material having a porous microstructure comprising polymeric fibrils and a total thickness of less than about 0.025 millimeters; and an ion exchange material in an amount effective to render an interior volume of the base material occlusive and provide a composite membrane having a Gurley number of greater than 10,000 seconds.

7. The method of claim 6, wherein the base material has a porous microstructure of nodes interconnected by fibrils.

8. The method of claim 7, wherein the base material has a porosity of greater than about 35 volume percent.

9. The method of claim 6, wherein the ion exchange material is selected from a group consisting of hydrocarbon-containing resins and fluorocarbon-containing resins.

10. The method of claim 9, wherein the hydrocarbon-containing resin is selected from the group consisting of phenolic acid-containing resins, sulfonic acid-containing resins, and condensation resins.

11. The method of claim 9, wherein the fluorocarbon-containing resin is selected from the group consisting of hydrates of a tetrafluoroethylene-perfluorosulfonyl ethoxyvinyl ether copolymer and tetrafluoroethylene-hydroxylated copolymer.

12. The method of claim 6, wherein the ion exchange material is a perfluorosulfonic acid/tetrafluoroethylene copolymer resin dissolved in a solvent solution selected from the group consisting of water, ethanol, isopropanol, butanol, methanol, and combinations thereof.

13. The method of claim 6, further comprising a reinforcement backing bonded to the membrane, wherein the reinforcement backing is selected from the group consisting of woven and nonwoven materials.

14. The method of claim 13, wherein the woven materials are selected from the group consisting of weaves of expanded porous polytetrafluoroethylene fibers, webs of polypropylene, and netting of polypropylene.

15. The method of claim 13, wherein the nonwoven material is spun-bonded polypropylene.

16. The method of claim 6, wherein the porous microstructure of the base material defines pores having an average pore size between about 0.05 and about 0.4 micrometers.

17. The method of claim 16, wherein the average pore size is less than about 0.2 micrometers.

18. The method of claim 6, wherein the total thickness of the base material is about 1.32 micrometers to about 25.4 micrometers.

19. The method of claim 6, wherein the ion exchange material is selected from the group consisting of perfluorinated sulfonic acid resin, perfluorinated carboxylic acid resin, polyvinyl alcohol, styrene-based polymers crosslinked with divinylbenzene, and metal salts complexed with a polymer.

20. A method for the electrolysis of water, comprising:

applying a potential across an ultrathin composite membrane disposed between a first electrode and a second electrode;

introducing water to the ultrathin composite membrane through a first flow field in fluid communication with at least a portion of the first electrode;

dissociating the water at the first electrode to form oxygen, protons, and electrons;

moving the protons across the ultrathin composite membrane to the second electrode; and recombining the protons and the electrons at the second electrode to form hydrogen in a second flow field, wherein a pressure differential across the ultrathin composite membrane exceeds about 10,000 psi.

21. The method of claim 20, wherein the ultrathin composite membrane comprises:

an expanded polytetrafluoro ethylene base material having a porous micro structure comprising polymeric fibrils and a total thickness of less than about 0.025 millimeters; and an ion exchange material in an amount effective to render an interior volume of the base material occlusive and provide a composite membrane having a Gurley number of greater than 10,000 seconds.

22. An electrolysis cell for the electrolysis of water, comprising:

a first electrode;

a second electrode;

an ultrathin composite membrane disposed between and in intimate contact with the first electrode and the second electrode;

a first flow field in fluid communication with the first electrode opposite the membrane;

a second flow field in fluid communication with the second electrode opposite the membrane;

a water source in fluid communication with the first flow field; and hydrogen removal means in fluid communication with the second flow field.

23. The cell of claim 22, wherein the ultrathin composite membrane comprises:

an expanded polytetrafluoroethylene base material having a porous microstructure comprising polymeric fibrils and a total thickness of less than about 0.025 millimeters; and an ion exchange material in an amount effective to render an interior volume of the base material occlusive and provide a composite membrane having a Gurley number of greater than 10,000 seconds.

* * * * *